United States Patent
Benazzi et al.

(12) 
(10) Patent No.: US 6,602,402 B1
(45) Date of Patent: Aug. 5, 2003

(54) FLEXIBLE PROCESS FOR PRODUCING BASE STOCK AND DISTILLATES BY CONVERSION-HYDROISOMERISATION USING A CATALYST WITH LOW DISPERSION FOLLOWED BY CATALYTIC DEWAXING

(75) Inventors: Eric Benazzi, Chatou (FR); Nathalie Marchal-George, Saint Genis Laval (FR); Tivadar Cseri, Courbevoie (FR); Pierre Marion, Antony (FR); Christophe Gueret, Gal (FR); Slavik Kasztelan, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/562,286

(22) Filed: May 1, 2000

(30) Foreign Application Priority Data

Apr. 29, 1999 (FR) ................................ 99 05496
Feb. 24, 2000 (FR) ................................ 00 02363

(51) Int. Cl.$^7$ ............................................... C10G 65/12
(52) U.S. Cl. ............................. 208/58; 208/62; 208/27; 585/310; 585/734; 585/736; 585/737
(58) Field of Search ........................... 208/62, 27, 58; 585/310, 734, 736, 737

(56) References Cited

U.S. PATENT DOCUMENTS

| | | | | |
|---|---|---|---|---|
| 4,832,824 A | * | 5/1989 | Vaughan et al. | 208/138 |
| 4,943,672 A | * | 7/1990 | Hamner et al. | 208/112 |
| 5,358,627 A | * | 10/1994 | Mears et al. | 208/100 |
| 5,834,522 A | * | 11/1998 | Mignard et al. | 208/143 |
| 5,879,539 A | * | 3/1999 | Mignard et al. | 208/138 |

FOREIGN PATENT DOCUMENTS

| | | |
|---|---|---|
| EP | 0 776 959 A2 | 6/1997 |
| WO | WO 95/27020 | 10/1995 |

* cited by examiner

*Primary Examiner*—Walter D. Griffin
(74) *Attorney, Agent, or Firm*—Millen, White, Zelano & Branigan, P.C.

(57) ABSTRACT

An improved process for producing very high quality base stock and for simultaneous production of high quality middle distallates, comprising successive hydroisomerisation and catalystic dewaxing steps wherein hydroisomerisation is carried out in the presence of a catalyst containing at least one noble metal deposited on an amorphous acidic support, the dispersion of the metal being less than 20%. The support is preferably an amorphous silica-alumina. Catalytic dewaxing is carried out in the presence of a catalyst containing at least one hydrodehydrogenating element (group VIII) and at least one molecular sieve (preferably zeolite). The sieve is preferable selected from NU-10, EU-1, EU-13, zeolite and ferrierite.

25 Claims, 4 Drawing Sheets

Figure 1:
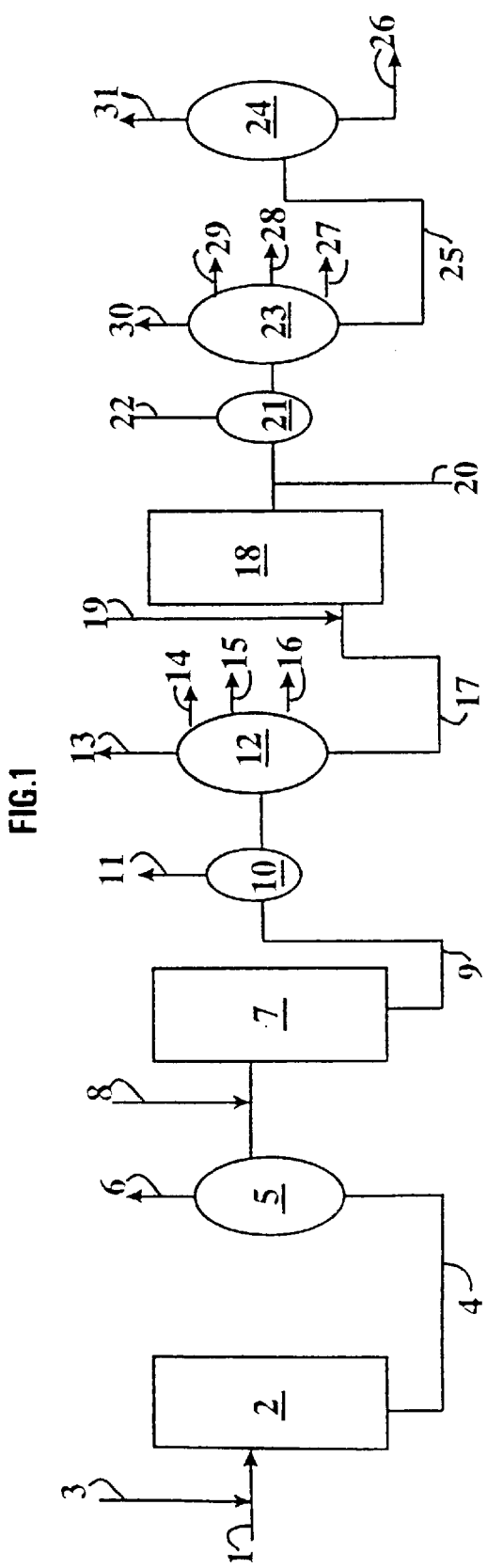

FLEXIBLE PROCESS FOR PRODUCING BASE STOCK AND DISTILLATES BY CONVERSION-HYDROISOMERISATION USING A CATALYST WITH LOW DISPERSION FOLLOWED BY CATALYTIC DEWAXING

CROSS-REFERENCE TO RELATED APPLICATION

This is application is related to Applicants concurrently filed application Ser. No. 09/562,478, entitled "Catalyst Based On A Noble Metal With Low Dispersion, And Its Use In Converting Hydrocarbon Feeds", based on French Application 99/05.495 filed Apr. 29, 1999 and application Ser. No. 09/562,479, entitled "Flexible Process For Producing Base Stock And Middle Distillates By Conversion-Hydroisomerisation Followed By Catalytic Dewaxing", based on French Applications 99/05.494 filed Apr. 29, 1999 and 00/02.364 filed Feb. 24, 2000.

The present invention relates to an improved process for producing very high quality base stock, i.e., with a high viscosity index (VI), good stability to UV and a low pour point, from hydrocarbon feeds (preferably from hydrocarbon feeds from the Fischer-Tropsch process or from hydrocracking residues), optionally with simultaneous production of very high quality middle distillates (in particular gas oils and kerosine,), i.e., with a low pour point and a high cetane index.

PRIOR ART

High quality lubricants are fundamentally important to proper operation of modern machines, automobiles and trucks.

Such lubricants are usually obtained by a succession of refining steps which can improve the properties of a petroleum cut. In particular, treating heavy petroleum fraction with large quantities of linear or slightly branched paraffins is necessary to obtain good quality base stock in the best possible yields, using an operation aimed at eliminating linear or very slightly branched paraffins from feeds which are then used as base stock.

High molecular weight paraffins which are linear or very slightly branched which are present in the oils result in high pour points and thus in coagulation for low temperature applications. In order to reduce the pour points, such linear paraffins which are not or are only very slightly branched must be completely or partially eliminated.

A further means is catalytic treatment in the presence or absence of hydrogen and because of their form selectivity, zeolites are among the most widely used catalysts.

Zeolite based catalysts such as ZSM-5, ZSM-11, ZSM-12, ZSM-22, ZSM-23, ZSM-35 and ZSM-38 have been described for use in such processes.

All catalysts currently used in hydroisomerisation are bifunctional, combining an acid function with a hydrogenating function. The acid function is provided by supports with large surface areas (in general 150 to 180 m$^2$/g) with a superficial acidity, such as halogenated aluminas (chlorinated or fluorinated in particular), phosphorous-containing aluminas, combinations of oxides of boron and aluminium, amorphous silica-aluminas and aluminosilicates. The hydrogenating function is provided either by one or more metals from group VIII of the periodic table such as iron, cobalt, nickel, ruthenium, rhodium, palladium, osmium, iridium and platinum, or by combining at least one group VI metal such as chromium, molybdenum or tungsten and at least one group VIII metal.

The balance between the two functions, acid and hydrogenating, is the fundamental parameter which governs the activity and selectivity of the catalyst. A weak acid function and a strong hydrogenating function produces catalysts with low activity which are selective as regards isomerisation, while a strong acid function and a weak hydrogenating function produces catalysts which are highly active and selective as regards cracking. A third possibility is to use a strong acid function and a strong hydrogenating function to obtain a highly active catalyst which is also highly selective as regards isomerisation. Thus by careful choice of each of the functions, the activity/selectivity balance of the catalyst can be adjusted.

In the process of the invention the Applicant proposes jointly producing very good quality middle distillates, base stock with a VI and a pour point at least equal to those obtained with a hydrorefining and/or hydrocracking process.

SUBJECT MATTER OF THE INVENTION

The Applicant's research has been concentrated on developing an improved process for producing very high quality lubricating oils and high quality middle distillates from hydrocarbon feeds, preferably from hydrocarbon feeds from the Fischer-Tropsch process or from hydrocracking residues.

The present invention thus relates to a sequence of processes for joint production of very high quality base stock and very high quality middle distillates (in particular gas oils) from petroleum cuts. The oils obtained have a high viscosity index (VI), low volatility, good UV stability and a low pour point.

More precisely, the invention provides a process for producing oils from a hydrocarbon feed (of which at least 20% by volume preferably has a boiling point of at least 340° C.), said process comprising the following steps in succession:

(a) converting the feed with simultaneous hydroisomerisation of at least a portion of the n-paraffins of the feed, said feed having a sulphur content of less than 1000 ppm by weight, a nitrogen content of less than 200 ppm by weight, a metals content of less than 50 ppm by weight, an oxygen content of at most 0.2% by weight (preferably said step being carried out at a temperature of 200–500° C., at a pressure of 2–25 MPa, with a space velocity of 0.1–10 h$^{-1}$, in the presence of hydrogen, at a ratio generally in the range 100–2000 l. H$_2$/l of feed), in the presence of a catalyst containing at least one noble metal deposited on an amorphous acidic support, the dispersion of the noble metal being less than 20%, (b) catalytic dewaxing of at least a portion of the effluent from step a), (preferably carried out at a temperature of 200–500° C., at a pressure of 1–25 MPa, with an hourly space velocity of 0.05–50 h$^{-1}$, in the presence of 50–2000 liters of hydrogen/liter of effluent entering step b)), in the presence of a catalyst comprising at least one hydrodehydrogenating element and at least one molecular sieve.

Thus step a) is optionally preceded by a hydrotreatment step generally carried out at a temperature of 200–450° C., at a pressure of 2 to 25 MPa, at a space velocity of 0.1–6 h$^{-1}$, in the presence of hydrogen in a hydrogen/hydrocarbon volume ratio of 100–2000 l/l, and in the presence of an amorphous catalyst comprising at least one group VIII metal and at least one group VIB metal.

All of the effluent from step a) can be sent to step b).

Step a) is optionally followed by separating the light gases from the effluent obtained at the end of step a).

Preferably, the effluent from the conversion-hydroisomerisation treatment undergoes a distillation step (preferably atmospheric) to separate compounds with a boiling point of less than 340° C. (gas, gasoline, kerosine, gas oil) from products with an initial boiling point of more than at least 340° C. and which form the residue. Thus in general, at least one middle distillate fraction with a pour point of at most −20° C. and a cetane index of at least 50 is separated.

Catalytic dewaxing step b) is thus applicable to at least the residue from the distillation step which contains compounds with a boiling point of more than at least 340° C. In a further implementation of the invention, the effluent from step a) is not distilled before carrying out step b). At most, at least a portion of the light gases are separated (by flash) and it then undergoes catalytic dewaxing.

Preferably, step b) is carried out using a catalyst containing at least one molecular sieve wherein the microporous system has at least one principal channel type with a pore opening containing 9 or 10 T atoms, T being selected from the group formed by Si, Al, P, B, Ti, Fe, Ga, alternating with an equal number of oxygen atoms, the distance between two accessible pore openings containing 9 or 10 T atoms being equal to 0.75 mm at most, and said sieve having a 2-methylnonane/5-methylnonane ratio of more than 5 in the n-decane test.

Advantageously, the effluent from the dewaxing treatment undergoes a distillation step advantageously comprising atmospheric distillation and vacuum distillation so as to separate at least one oil fraction with a boiling point of more than 340° C. It usually has a pour point of less than −10° C., and a VI of more than 95, with a viscosity of at least 3 cSt (i.e., 3 mm$^2$/s) at 100° C. This distillation step is essential when there is no distillation step between steps a) and b).

Advantageously, the effluent from the dewaxing treatment, which has optionally been distilled, undergoes a hydrofinishing treatment.

DETAILED DESCRIPTION OF THE INVENTION

The process of the invention comprises the following steps:

The Feed

The hydrocarbon feed from which the high quality oils and optional middle distillates are produced contains at least 20% by volume of compounds boiling above 340° C., preferably at least 350° C. and advantageously at least 380° C. This does not means that the boiling point is 380° C. and higher, but 380° C. or higher.

The feed contains n-paraffins. Preferably, the feed is an effluent from a Fischer-Tropsch unit. A wide variety of feeds can be treated using the process.

The feed can, for example, also be a vacuum distillate from straight run crude distillation or from conversion units such as FCC, a coker or from visbreaking, or from aromatic compound extraction units, or originating from AR (atmospheric residue) and/or VR (vacuum residues) hydrotraitment (desulphuration) or hydroconversion, or the feed can be a deasphalted oil, or a hydrocracking residue, for example from VD, or any mixture of the feeds cited above. The above list is not limiting.

In general, suitable feeds have an initial boiling point of more than at least 340° C., preferably more than at least 370° C.

The feed introduced into conversion-hydroisomerisation step a) must be clean. The term "clean feed" means feeds in which the sulphur content is less than 1000 ppm by weight, preferably less than 500 ppm by weight, more preferably less than 300 ppm by weight or still more preferably less than 200 ppm by weight. The nitrogen content is less than 200 ppm by weight, preferably less than 100 ppm by weight, more preferably less than 50 ppm by weight. The metal content in the feed, such as nickel or vanadium, is extremely reduced, i.e., less than 50 ppm by weight, more advantageously less than 10 ppm by weight, or preferably less than 2 ppm by weight.

When the amounts of unsaturated or oxygen-containing products can cause too great a deactivation of the catalytic system, the feed (for example from the Fischer-Tropsch process) must undergo hydrotreatment in a hydrotreatment zone before entering the hydroisomerisation zone. Hydrogen is reacted with the feed in contact with a hydrotreatment catalyst the role of which is to reduce the amount of unsaturated and oxygen-containing hydrocarbon molecules (produced, for example, during the Fischer-Tropsch process).

The oxygen content is then reduced to at most 0.2% by weight.

When the feed to be treated is not clean in the sense defined above, it first undergoes a prior hydrotreatment step during which it is brought into contact, in the presence of hydrogen, with at least one catalyst comprising an amorphous support and at least one metal with a hydrodehydrogenating function ensured, for example, by at least one group VIB and at least one group VIII element, at a temperature in the range 200° C. to 450° C., preferably 250° C.–450° C., advantageously 330–450° C., or 360–420° C. at a pressure in the range 5 to 25 MPa and preferably less than 20 MPa, preferably in range 5 to 20 MPa, the space velocity being in the range 0.1 to 6 h$^{-1}$, preferably 0.3–3 h$^{-1}$, and the quantity of hydrogen introduced being such that the hydrogen/hydrocarbon volume ratio is in the range 100 to 2000 liters/liter.

The support is generally based on (and preferably is essentially constituted by) amorphous alumina or silica-alumina, it can also comprise boron oxide, magnesia, zirconia, titanium oxide or a combination of these oxides. The hydro-dehydrogenating function is preferably fulfilled by at least one metal or compound of a metal from groups VIII and VIB, preferably selected from molybdenum, tungsten, nickel and cobalt.

This catalyst can advantageously contain phosphorous, this compound is known in the prior art to have two advantages for hydrotreatment catalysts: facility of preparation in particular when impregnating with nickel and molybdenum solutions, and better hydrogenation activity.

Preferred catalysts are NiMo and/or NiW on alumina catalysts, as well as NiMo and/or NiW on alumina catalysts doped with at least one element selected from the group formed by phosphorous, boron, silicon and fluorine, or NiMo and/or NiW on silica-alumina catalysts, or on silica-alumina-titanium oxide doped or not doped with at least one element selected from the group formed by phosphorous, boron, fluorine and silicon atoms.

The total concentration of oxides of group VIB and VIII metals is in the range 5% to 40% by weight, preferably in the range 7% to 30% and the weight ratio, expressed as the metal oxide, of the group VI metal (or metals) to the group VIII metal (or metals) is preferably in the range 20 to 1.25, more preferably in the range 10 to 2. The concentration of phosphorous oxide $P_2O_5$ is less than 15% by weight, preferably less than 10% by weight.

If necessary, intermediate separation of water ($H_2O$), $H_2S$ and $NH_3$ is carried out on the product obtained at the end of the hydrotreatment step to bring the water, $H_2S$ and $NH_3$ contents to values of less than at most 100 ppm, 200 ppm, 50 ppm respectively in the feed introduced into step a). At this point, the products with a boiling point of less than 340° C. can optionally be separated in order to treat only a residue in step a).

When a hydrocracking residue is treated, the feed which is present has already undergone a hydrotreatment and a hydrocracking step. The feed proper can then be directly treated in step a).

In general, hydrocracking takes place on a zeolitic catalyst usually based on a Y zeolite, in particular dealuminated Y zeolites.

The catalyst also contains at least one non noble group VIII metal and at least one group VIB metal.

Step a): Hydroisomerisation-conversion

The Catalyst

Step a) takes place in the presence of hydrogen and in the presence of a bifunctional catalyst comprising at least one noble metal deposited on an amorphous acidic support, the noble metal dispersion being less than 20%.

During this step the n-paraffins, in the presence of a bifunctional catalyst, undergo isomerisation then possibly hydrocracking to result respectively in the formation of isoparaffins and cracking products which are lighter than gas oils and kerosine.

Preferably, the fraction of noble metal particles less than 2 nm in size represents at most 2% by weight of the noble metal deposited on the catalyst.

Advantageously, the size of at least 70% (preferably at least 80%, more preferably at least 90%) of the noble metal particles is over 4 nm (number %).

The support is amorphous and contains no molecular sieve; the catalyst contains no molecular sieve.

The acidic support can be selected from the group formed by a silica alumina, boron oxide, a zirconia used alone or as a mixture of the two or with a matrix (for example non acidic).

The acidic support is generally selected from the group formed by a silica-alumina, a halogenated alumina (preferably fluorinated), an alumina doped with silicon (deposited silicon), an alumina-titanium oxide mixture, a sulphated zirconia, a zirconia doped with tungsten, and mixtures thereof or with at least one amorphous matrix selected from the group formed by alumina, titanium oxide, silica, boron oxide, magnesia, zirconia and clay, for example.

Preferred supports are amorphous silica-alumina and silica-alumina-titanium oxide (amorphous).

The acidity measurement is well known to the skilled person. It can, for example, be made by temperature programmed desorption (TPD) with ammonia, by infrared measurement of absorbed molecules (pyridine, CO . . . ), by a catalytic cracking test or by hydroconversion using a model molecule.

A preferred catalyst of the invention comprises (and is preferably essentially constituted by) 0.05% to 10% by weight of at least one noble metal from group VIII deposited on an amorphous silica-alumina support.

In more detail, the catalyst characteristics are as follows:

Silica content: The preferred support used to produce the catalyst described in the present patent is composed of silica $SiO_2$ and alumina $Al_2O_3$ from synthesis. The silica content of the support, expressed as a percentage by weight, is generally in the range 1% to 95%, advantageously in the range 5% to 95%, more preferably in the range 10% to 80% and still more preferably in the range 20% to 70%, or even 22% to 45%. This silica content can be accurately measured using X ray fluorescence.

Nature of noble metal: For this particular type of reaction, the metallic function is provided by a noble metal from group VIII of the periodic table, more particularly platinum and/or palladium.

Noble metal content: The noble metal content, expressed as the % by weight of metal with respect to the catalyst, is in the range 0.05% to 10%, more preferably in the range 0.1% to 5%.

Noble metal dispersion: The dispersion, representing the fraction of metal accessible to the reactant with respect to the total quantity of the metal of the catalyst, can be measured by $H_2/O_2$ titration, for example. The metal is first reduced, i.e., it undergoes a treatment in a stream of hydrogen at a high temperature under conditions such that all of the platinum atoms which are accessible to hydrogen are transformed into the metal form. Then a stream of oxygen is passed under operating conditions which are such that all of the reduced platinum atoms accessible to the oxygen are oxidised to the $PtO_2$ form. By calculating the difference between the quantity of oxygen introduced and the quantity of oxygen leaving, the quantity of oxygen consumed can be determined. This latter value can be used to deduce the quantity of platinum which is accessible to the oxygen. The dispersion is then equal to the ratio of the quantity of platinum accessible to oxygen over the total quantity of platinum of the catalyst. In our case, the dispersion is less than 20%, it is generally more than 1% or, preferably, 5%.

Particle size, measured by Transmission Electron Microscopy: In order to determine the size and distribution of the metal particles, we used transmission electron microscopy. After preparation, the catalyst sample was finely ground in an agate mortar then dispersed in ethanol using ultrasound. Samples were taken from different locations to ensure a true representation and were deposited on a copper grid coated with a thin carbon film. The grids were then air dried under an infrared lamp before being introduced into the microscope for observation. In order to estimate the average particle size of the noble metal, several hundred measurements were made from several tens of exposures. This set of measurements was used to produce a histogram of particle size distribution. We could then precisely estimate the proportion of particles corresponding to each particle size range.

Distribution of noble metal: The noble metal distribution represents the distribution of the metal inside the catalyst grain, the metal being well or poorly dispersed. Thus it is possible to obtain platinum which is poorly distributed (for example detected in a crown the thickness of which is substantially less than the grain radius) but well dispersed, i.e., all of the platinum atoms situated in the crown are accessible to the reactants. In our case, the platinum distribution is good, i.e., the platinum profile, measured using a Castaing microprobe method, has a distribution coefficient of more than 0.1, advantageously more than 0.2, preferably more than 0.5.

BET surface area: The BET surface area of the support is generally in the range 100 $m^2/g$ to 500 $m^2/g$, preferably in the range 250 $m^2/g$ to 450 $m^2/g$, and for silica-alumina based supports, more preferably in the range 310 $m^2/g$ to 450 $m^2/g$.

Global pore volume of support: For silica-alumina based supports, it is generally less than 1.2 ml/g, preferably in the range 0.3 to 1.1 ml/g, and more advantageously less than 1.05 ml/g.

The silica-alumina, and in general any support, is prepared and formed using the usual methods which are well known to the skilled person. Advantageously, prior to impregnating the metal, the support is calcined, for example by means of a heat treatment at 300–750° C. (preferably 600° C.) for a period in the range 0.25 to 10 hours (preferably 2 hours) in 0–30% by volume of steam (preferably about 7.5% for a silica-alumina matrix).

The metal salt is introduced using one of the usual methods for depositing a metal (preferably platinum) on the surface of a support. One preferred method is dry impregnation which consists of introducing the metal salt into a volume of solution which is equal to the pore volume of the catalyst mass to be impregnated. Before the reduction operation and to obtain the metal particle size distribution, the catalyst is calcined in moist air at 300–750° C. (preferably 550° C.) for 0.25–10 hours (preferably 2 hours). The partial pressure of $H_2O$ during calcining is, for example, 0.05 bars to 0.50 bars (preferably 0.15 bars). Other known treatment methods for producing less than 20% dispersion are also suitable.

This conversion step a) is usually accompanied by paraffin hydroisomerisation. The process has the advantage of flexibility: depending on the degree of conversion, the production is directed towards oils or middle distillates. The conversion is generally in the range 5–90%.

Before using the hydroisomerisation-conversion reaction, the metal contained in the catalyst is reduced. One preferred method for reducing the metal is a treatment in hydrogen at a temperature in the range 150° C. to 650° C. and at a total pressure in the range 0.1 to 25 MPa. As an example, reduction consists of a constant temperature stage at 150° C. for 2 hours then raising the temperature to 450° C. at a rate of 1° C./min followed by a constant temperature stage of 2 hours at 450° C.; during the whole of this reduction step, the hydrogen flow rate is 1000 l of hydrogen/l of catalyst. It should also be noted that any ex-situ reduction method is suitable.

The operating conditions under which step a) is carried out are important.

The pressure is generally in the range 2 to 25 MPa (usually at least 5 MPa), preferably 2 (or 3) to 20 MPa and advantageously 2 to 18 MPa; the hourly space velocity is normally in the range 0.1 $h^{-1}$ to 10 $h^{-1}$, preferably in the range 0.2 to 10 $h^{-1}$ and advantageously in the range 0.1 or 0.5 $h^{-1}$ to 5.0 $h^{-1}$, and the hydrogen ratio is advantageously in the range 100 to 2000 liters of hydrogen per liter of feed and preferably in the range 150 to 1500 liters of hydrogen per liter of feed.

The temperature used in this step is usually in the range 200° C. to 500° C. (or 450° C.) and preferably in the range 250° C. to 450° C., advantageously in the range 300° C. to 450° C. and more advantageously more than 340° C., for example in the range 320–450° C.

The hydrotreatment and hydroisomerisation-conversion steps can be carried out using two types of catalysts in a plurality (two or more) of different reactors, and/or on at least two catalytic beds installed in the same reactor.

The use of the catalyst below described in step a) increases the viscosity index (VI). More generally, the increase in VI is at least 2 points, the VI being measured on a solvent dewaxed feed (residue) and on the product from step a), also solvent dewaxed, aiming at a pour point temperature in the range −15° C. to −20° C.

In general, the VI is increased by at least 5 points, and usually by more than 5 points, or even 10 points or more than 10 points.

It is possible to control the increase in VI by measuring the conversion. It is thus possible to optimise the production towards high VI oils or to higher oil yields but with a VI that is not as high.

In parallel to increasing the VI, the pour point is usually reduced, from a few degrees up to 10–15° C. or more (for example 25° C.). The size of the reduction varies depending on the conversion and thus on the operating conditions and the feed.

Treatment of Effluent from Step a)

In a preferred implementation, the whole of the effluent from hydroisomerisation-conversion step a) is treated in dewaxing step b). In a variation, at least a portion (and preferably at least the major portion) of the light gases comprising hydrogen and possibly hydrocarbon-containing compounds containing at most 4 carbon atoms can be separated. Hydrogen can be separated first. The implementation (no variation) with passage of the whole of the effluent from step a) into step b) is of economic interest since a single distillation unit is used at the end of the process. Further, the final distillation (after catalytic dewaxing or subsequent treatments) produces a low temperature gas oil.

Advantageously, in a further implementation, the effluent from step a) is distilled to separate the light gases and also to separate at least one residue containing compounds with a boiling point of more than at least 340° C. Preferably, atmospheric distillation is carried out.

Advantageously, distillation can be carried out to obtain a plurality of fractions (gasoline, kerosine, gas oil, for example) with a boiling point of at most 340° C. and a fraction (residue) with an initial boiling point of more than at least 340° C. and preferably more than 350° C., more preferably at least 370° C. or 380° C.

In a preferred variation of the invention, this fraction (residue) is then treated in a catalytic dewaxing step, i.e., without undergoing vacuum distillation. However in a still further variation, vacuum distillation can be carried out.

In an implementation which is more closely aimed at producing middle distillates, and in accordance with the invention, a portion of the residue from the separation step can be recycled to the reactor containing the conversion-hydroisomerisation catalyst to convert it and increase the production of middle distillates.

In general, the term "middle distillates" as used in this text is applied to fraction(s) with an initial boiling point of at least 150° C. and an end point of just before the residue, i.e., generally up to 340° C., 350° C., preferably less than 370° C. or 380° C.

Before or after distillation, the effluent from step a) can undergo other treatments such as extraction of at least a portion of the aromatic compounds.

Step b): Catalytic Hydrodewaxing

At least a portion of the effluent from step a), which effluent has possibly undergone the separation and/or treatment steps described above, then undergoes a catalytic dewaxing step in the presence of hydrogen and a hydrodewaxing catalyst comprising an acidic function, a metallic hydrodehydrogenating function and at least one matrix.

It should be noted that compounds boiling above at least 340° C. always undergo catalytic dewaxing.

The Catalyst

The acid function is provided by at least one molecular sieve, preferably a molecular sieve with a microporous system having at least one principal channel type with openings formed by rings containing 9 or 10 T atoms. The T atoms are tetrahedral constituent atoms of the molecular sieve and can be at least one of the elements contained in the following set of atom: (Si, Al, P, B, Ti, Fe, Ga). Atoms T, defined above, alternate with an equal number of oxygen atoms in the constituent rings of the channel openings. Thus it can also be said that the openings are formed from rings containing 9 or 10 oxygen atoms or formed by rings containing 9 or 10 T atoms.

The molecular sieve forming part of the composition of the hydrodewaxing catalyst can also include other channel types but with openings formed from rings containing less than 10 T atoms or oxygen atoms.

The molecular sieve forming part of the preferred catalyst composition also has a bridging distance, the distance between two pore openings as defined above, which is at most 0.75 nm (1 nm =$10^{-9}$ m), preferably in the range 0.50 nm to 0.75 nm, more preferably in the range 0.52 nm to 0.73 nm; such sieves can produce good catalytic performances in the hydrodewaxing step.

The bridging distance is measured using a molecular modelling tool such as Hyperchem or Biosym, which enables the surface of the molecular sieves under consideration to be constructed using the ionic radii of the elements present in the sieve framework, to measure the bridging distance.

The preferred catalyst which is suitable for this process is characterized by a catalytic test known as a standard pure n-decane transformation test which is carried out at a partial pressure of 450 kPa of hydrogen and a partial pressure of n-$C_{10}$ of 1.2 kPa, giving a total pressure of 451.2 kPa in a fixed bed with a constant n-$C_{10}$ flow rate of 9.5 ml/h, a total flow rate of 3.6 l/h and a catalyst mass of 0.2 g. The reaction is carried out in upflow mode. The degree of conversion is adjusted by the temperature at which the reaction is carried out. The test catalyst is constituted by pelletised pure zeolite and 0.5% by weight of platinum.

In the presence of a molecular sieve and a hydro-dehydrogenating function, n-decane undergoes hydroisomerisation reactions which produce isomerised products containing 10 carbon atoms, and hydrocracking reactions leading to the formation of products containing less than 10 carbon atoms.

Under these conditions, a molecular sieve used in the hydrodewaxing step of the invention must have the physico-chemical characteristics described above and lead, for a yield of isomerised n-$C_{10}$ products of the order of 5% by weight (the degree of conversion is regulated by the temperature), to a 2-methylnonane/5-methylnonane ratio of more than 5 and preferably more than 7.

The use of molecular sieves selected in this manner and under the conditions described above selected from the numerous molecular sieves already in existence enables products with a low pour point and a high viscosity index to be produced in good yields in the process of the invention.

Examples of molecular sieves which can be used in the preferred composition of the catalytic hydrodewaxing catalyst are the following zeolites; ferrierite, NU-10, EU-13, EU-1.

Preferably, the molecular sieves used in the composition of the hydrodewaxing catalyst are included in the set formed by ferrierite and EU-1 zeolite.

In general, the hydrodewaxing catalyst comprises a zeolite selected from the group formed by NU-10, EU-1, EU-13, ferrierite, ZSM-22, Theta-1, ZSM-50, NU-23, ZSM-35, ZSM-38, ZSM-23, ZSM-48, ISI-1, KZ-2, ISI-4, KZ-1.

The quantity of molecular sieve in the hydrodewaxing catalyst is in the range 1% to 90% by weight, preferably in the range 5% to 90% by weight and more preferably in the range 10% to 85% by weight.

Non limiting examples of matrices used to produce the catalyst are alumina gel, alumina, magnesia, amorphous silica-alumina and mixtures thereof. Techniques such as extrusion, pelletisation or bowl granulation can be used to carry out the forming operation.

The catalyst also comprises a hydro-dehydrogenating function ensured, for example, by at least one group VIII element and preferably at least one noble element selected from the group formed by platinum and palladium. The amount of non noble group VIII metal with respect to the final catalyst is in the range 1% to 40%, preferably in the range 10% to 30%. In this case, the non noble metal is often associated with at least one group VIB metal (preferably Mo and W). If at least one noble group VIII metal is used, the quantity with respect to the final catalyst is less than 5% by weight, preferably less than 3% and more preferably less than 1.5%.

When using noble group VIII metals, the platinum and/or palladium is/are preferably localised on the matrix.

The hydrodewaxing catalyst of the invention can also contain 0 to 20%, preferably 0 to 10% by weight (expressed as the oxides) of phosphorous. The combination of group VIB metal(s) and/or group VIII metal(s) with phosphorous is particularly advantageous.

The Treatment

The residue obtained from step a) and distillation and which is treated in this hydrodewaxing step b) has the following characteristics: it has an initial boiling point of more than 340° C. and preferably more than 370° C., a pour point of at least 15° C., a viscosity index of 35 to 165 (before dewaxing), preferably at least 110 and more preferably less than 150, a viscosity at 100° C. of 3 cSt (mm$^2$/s) or more, an aromatic compound content of 10% by weight, a nitrogen content of less than 10 ppm by weight, and a sulphur content of less than 50 ppm by weight or, preferably, 10 ppm by weight.

The operating conditions for the catalytic step of the process of the invention are as follows the reaction temperature is in the range 200° C. to 500° C., preferably in the range 250° C. to 470° C. advantageously 270–430° C.;

the pressure is in the range 0.1 (or 0.2) to 25 Mpa ($10^6$ Pa), preferably in the range 1.0 to 20 MPa;

the hourly space velocity (HSV, expressed as the volume of feed injected per unit volume of catalyst per hour) is in the range from about 0.05 to about 50, preferably in the range about 0.1 to about 20 h$^{-1}$, more preferably in the range 0.2 to 10 h$^{-1}$.

They are selected to produce the desired pour point.

The feed and catalyst are brought into contact in the presence of hydrogen. The amount of hydrogen used, expressed in liters of hydrogen per liter of feed, is in the range 50 to about 2000 liters of hydrogen per liter of feed, preferably in the range 100 to 1500 liters of hydrogen per liter of feed.

Effluent Obtained

The effluent at the outlet from hydrodewaxing step b) is sent to the distillation train which preferably integrates atmospheric distillation and vacuum distillation, with the aim of separating the conversion products with a boiling point of less than 340° C. and preferably less than 370° C. (and including those formed during the catalytic hydrodewaxing step), and separating the fraction which constitutes the base stock and for which the initial boiling point is more than at least 340° C. and preferably 370° C. or more.

Further, this vacuum distillation section can separate different grades of oils.

Preferably, before being distilled, at least a portion and preferably the whole of the effluent from the outlet from catalytic hydrodewaxing step b) is sent over a hydrofinishing catalyst in the presence of hydrogen to carry out deep hydrogenation of the aromatic compounds which have a deleterious effect on the stability of the oils and distillates. However, the acidity of the catalyst must be sufficiently weak so as not to lead to the formation of a cracking product with a boiling point of less than 340° C. so as not to degrade the final yields, in particular the oil yields.

The catalyst used in this step comprises at least one group VIII metal and/or at least one element from group VIB of the periodic table. The strong metallic functions platinum: and/or palladium, or nickel-tungsten, nickel-molybdenum combinations, are advantageously used to carry out deep hydrogenation of the aromatic compounds.

These metals are deposited and dispersed on an amorphous or crystalline oxide type support, such as aluminas, silicas and silica-aluminas.

The hydrofinishing (HDF) catalyst can also contain at least one element from group VIIA of the periodic table. Preferably, these catalysts contain fluorine and/or chlorine.

The metal contents are in the range 10% to 30% in the case of non noble metals and less than 2%, preferably in the range 0.1% to 1.5%, more preferably in the range 0.1% to 1.0% in the case of noble metals.

The total quantity of halogen is in the range 0.02% to 30% by weight, advantageously 0.01% to 15%, or 0.01% to 10%, preferably 0.01% to 5%.

Catalysts containing at least one noble group VIII metal (for example platinum) and at least one halogen (chlorine and/or fluorine), a combination of chlorine and fluorine being preferred, can be cited as catalysts suitable for use in this hydrorefining step, and lead to excellent performances in particular for the production of medicinal oils.

The following conditions are employed for the hydrofinishing step of the process of the invention:
- the reaction temperature is in the range 180° C. to 400° C., preferably in the range 210° C. to 350° C., advantageously 230–320° C.;
- the pressure is in the range 0.1 to 25 MPa ($10^6$ Pa), preferably in the range 1.0 to 20 MPa;
- the hourly space velocity (HSV, expressed as the volume of feed injected per unit volume of catalyst per hour) is in the range from about 0.05 to about 100, preferably in the range about 0.1 to about 30 $h^{-1}$.

Contact between the feed and the catalyst is carried out in the presence of hydrogen. The amount of hydrogen used and expressed in liters of hydrogen per liter of feed is in the range 50 to about 2000 liters of hydrogen per liter of feed, preferably in the range 100 to 1500 liters of hydrogen per liter of feed.

Advantageously, the temperature of the HDF step is lower than the temperature of the catalytic hydrodewaxing step (CHDW). The difference $T_{CHDW}-T_{HDF}$ is generally in the range 20° C. to 200° C., preferably in the range 30° C. to 100° C. The effluent at the outlet from the HDF step is sent to the distillation train.

The Products

The base stock obtained using this process has a pour point of less than −10° C., a VI of more than 95, preferably more than 110 and more preferably more than 120, a viscosity of at least 3.0 cSt at 100° C., an ASTM colour of less than 1 and a UV stability such that the increase in the ASTM colour is in the range 0 to 4, preferably in the range 0.5 to 2.5.

The UV stability test, adapted from the ASTM D925-55 and D1148-55 procedures, is a rapid method for comparing the stability of lubricating oils exposed to a source of ultraviolet radiation. The test chamber is constituted by a metal chamber provided with a rotary plate which receives the oil samples. A bulb producing the same ultraviolet radiation as that of solar radiation placed in the top of the test chamber is directed downwards onto the samples. The samples include a standard oil with known UV characteristics. The ASTM D 1500 colour of the samples is determined at t=0 then after 45 h of exposure at 55° C. The results for the standard sample and the test samples are transcribed as follows:
a) initial ASTM D1500 colour;
b) final ASTM D1500 colour;
c) increase in colour;
d) cloudiness;
e) precipitate.

A further advantage of the process of the invention is that it is possible to achieve very low aromatic compound contents of less than 2% by weight, preferably 1% by weight and more preferably less than 0.05% by weight) and even of producing medicinal quality white oils with aromatic compound contents of less than 0.01% by weight. The UV absorbance values of these oils at 275, 295 and 300 nanometres are less than 0.8, 0.4 and 0.3 respectively (ASTM D2008 method) and have a Saybolt colour in the range 0 to 30.

The fact that the process of the invention can also produce medicinal quality white oils is of particular interest. Medicinal white oils are mineral oils obtained by deep refining of petroleum; their quality is subject to different regulations which are aimed at guaranteeing that they are harmless for pharmaceutical applications. They are non toxic and are characterized by their density and viscosity. Medicinal white oils essentially comprise saturated hydrocarbons, they are chemically inert and they have a low aromatic hydrocarbon content. Particular attention is paid to aromatic compounds in particular those containing 6 polycyclic aromatic hydrocarbons (PAH) which are toxic and present in concentrations of one part per million by weight of aromatic compounds in white oil. The total aromatic content can be monitored using the ASTM D2008 method, this UV absorption test at 275, 292 and 300 nanometres enabling an absorbance of less than 0.8, 0.4 and 0.3 respectively to be monitored (i.e., the white oils have aromatic compound contents of less than 0.01% by weight). These measurements are made with concentrations of 1 g of oil per liter, in a 1 cm cell. Commercially available white oils are distinguished by their viscosity and also by their crude of origin which may be paraffinic or naphthenic, these two parameters causing differences both in the physico-chemical properties of the white oils and in their chemical composition.

Currently, oil cuts whether originating from straight run distillation of a crude petroleum followed by extraction of aromatic compounds by a solvent, or from a catalytic hydrorefining or hydrocracking process, still contain non negligible quantities of aromatic compounds. Current legislation in the majority of industrialised nations requires that medicinal white oils must have an aromatic compound content below a threshold imposed by the legislation in each of the countries. The absence of these aromatic compounds in oil cuts results in a Saybolt colour specification which must be substantially at least 30 (+30), a maximum UV adsorption which must be less than 1.60 at 275 nm on a pure product in a 1 centimetre cell and a maximum absorption specification for products extracted by DMSO which must be less than 0.1 for the American market (Food and Drug Administration, standard N° 1211145). This latter test consists of specifically extracting polycyclic aromatic hydrocarbons using a polar solvent, usually DMSO, and checking their content in the extract by measuring the UV absorption in the 260–350 nm range.

FIGURES

Figure 2:
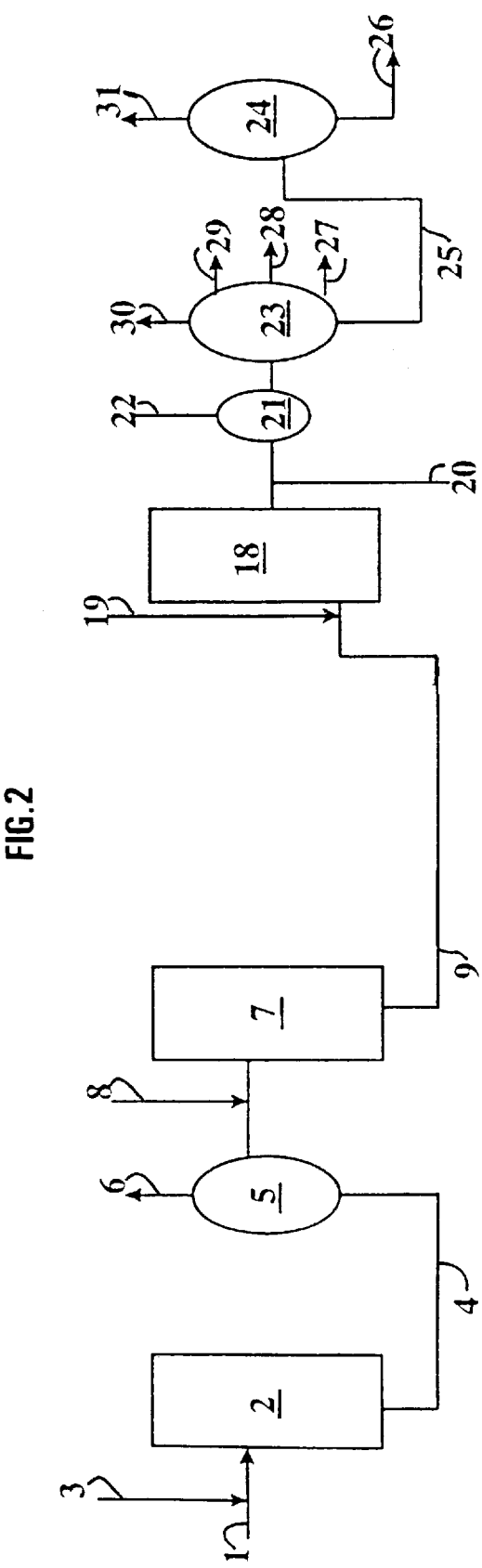
Figure 3:
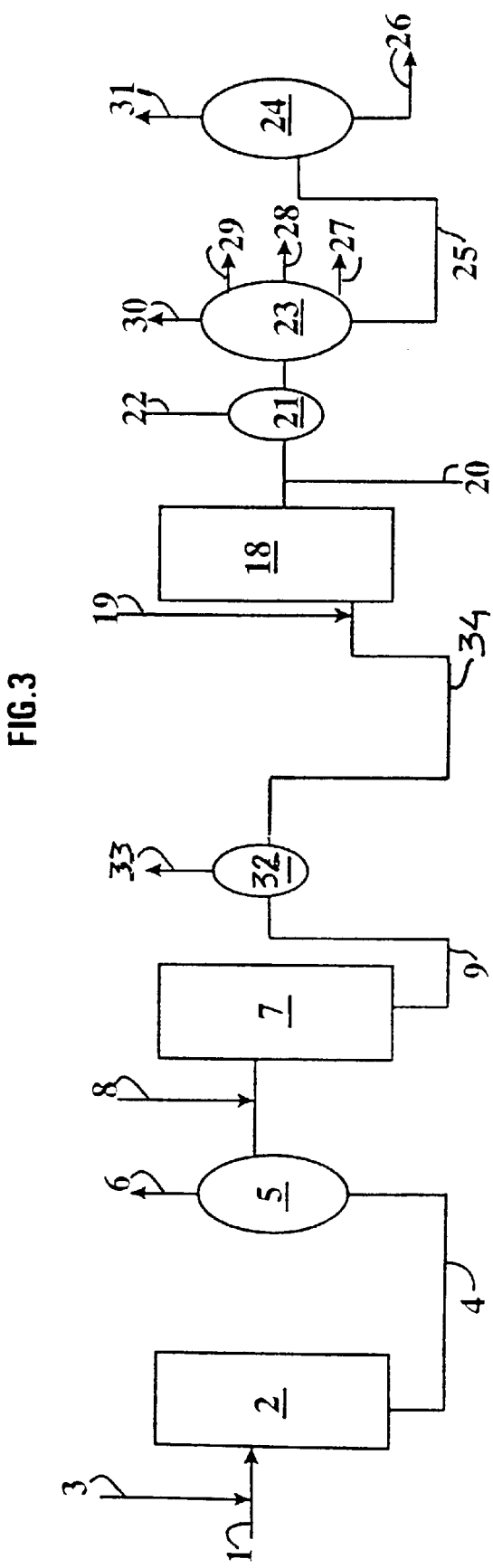
Figure 4:
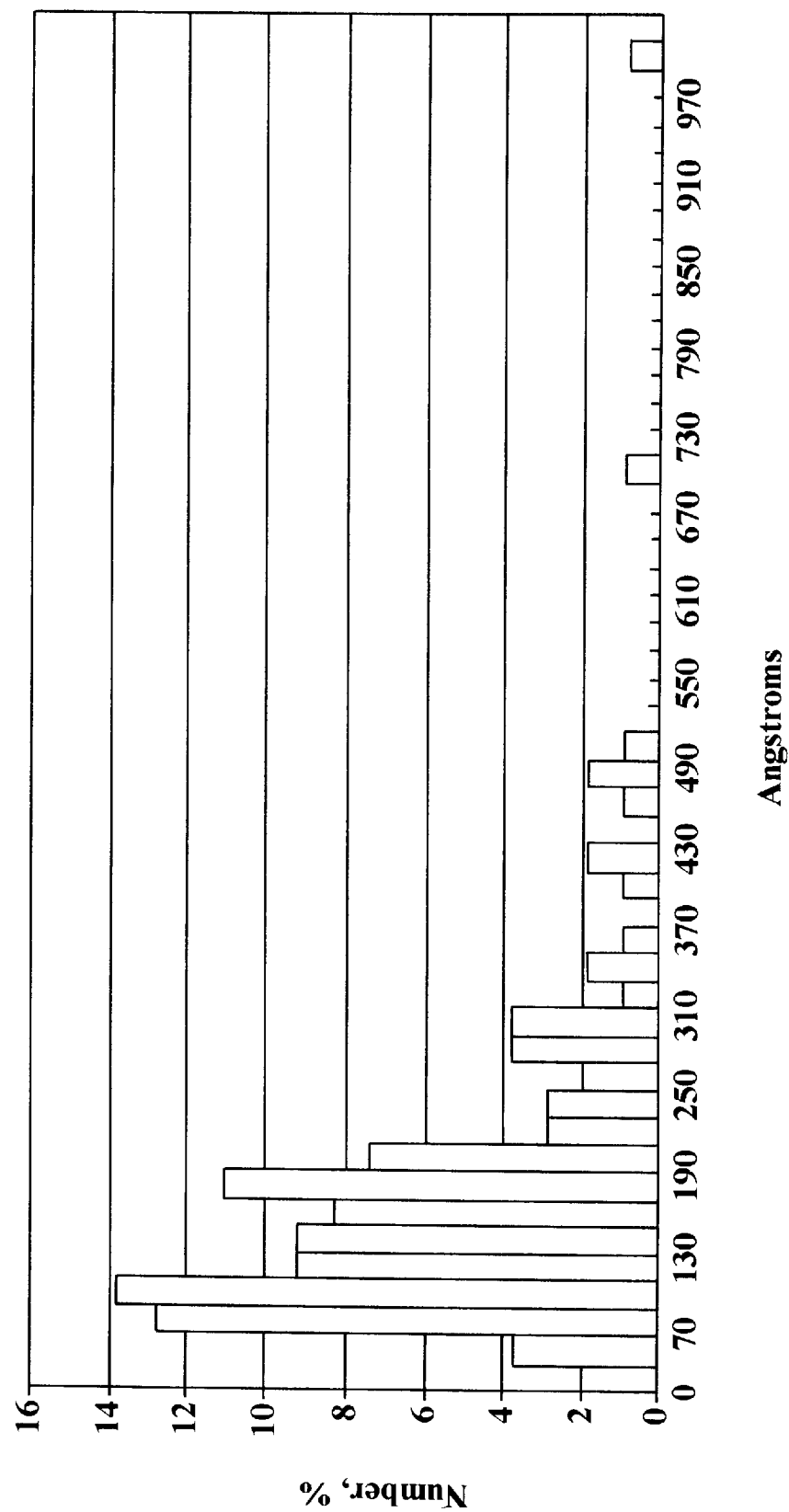

The invention will now be illustrated using FIGS. 1 to 3, representing different implementations for the treatment of a feed from the Fischer-Tropsch process or of a hydrocracking residue, for example. FIG. 4 is a histogram of the fraction of Pt particles more than 2 nm in size and shows that particles with a size in the range 13±6 nm represented at least 70 number % of the particles.

FIG. 1

In FIG. 1, the feed enters via a line (1) into a hydrotreatment zone (2) (which can be composed of one or more reactors, and comprises one or more catalytic beds of one or more catalysts) into which the hydrogen enters (for example via line (3)) and where hydrotreatment step (a) is carried out.

The hydrotreated feed is transferred via line (4) into a hydroisomerisation zone (7) (which can be composed of one or more reactors, and comprises one or more catalytic beds of one or more catalysts) where hydroisomerisation step a) is carried out in the presence of hydrogen. Hydrogen can be supplied via a line (8).

In this figure, before being introduced into zone (7), the feed to be hydroisomerised is freed of a large portion of its water in drum (5), the water leaving via line (6) and possibly ammonia and hydrogen sulphide $H_2S$, when the feed entering via line 1 contains sulphur and nitrogen.

The effluent leaving zone (7) is sent via a line (9) to a drum (10) to separate hydrogen via a line (11), the effluent is then distilled under atmospheric pressure in a column (12) from which a light fraction comprising compounds containing at most 4 carbon atoms and those boiling below this are extracted overhead via a line (13).

In general, at least one gasoline fraction (14) and at least one middle distillate (kerosine (15) and gas oil (16), for example) are obtained.

A fraction containing compounds with a boiling point of more than at least 340° C. is obtained from the bottom of the column. This fraction is evacuated via line (17) to catalytic dewaxing zone (18).

Catalytic dewaxing zone (18) (comprising one or more reactors, one or more catalytic beds of one or more catalysts) also receives hydrogen via a line (19) to carry out step b) of the process.

The effluent leaving via line (20) is separated in a distillation train comprising, in addition to drum (21) for separating hydrogen via a line (22), an atmospheric distillation column (23) and a vacuum column (24) which treats the atmospheric distillation column transferred via line (25), the residue having an initial boiling point of more than 340° C.

The products from the distillations are an oil fraction (line 26), and lower boiling fractions such as gas oil (line 27), kerosine (line 28), gasoline (line 29); light gases are eliminated via line (30) of the atmospheric column and via line (31) of the vacuum distillation column.

The effluent leaving via line (20) can advantageously be sent to a hydrofinishing zone (not shown) (comprising one or more reactors, one or more catalytic beds of one or more catalysts). Hydrogen can be added to this zone if necessary. The departing effluent is then transferred to drum (21) and the distillation train described above.

In order not to complicate the figure, the hydrogen recycle has not been shown, either from drum (10) to the hydrotreatment and/or hydroisomerisation step, and/or from drum (21) to the dewaxing and/or hydrofinishing step.

FIG. 2

This uses the reference numerals of FIG. 1. In this implementation, the whole of the effluent from hydroisomerisation-conversion zone (7) (step a)) passes directly via line (9) into catalytic dewaxing zone 18 (step b)).

FIG. 3

This also uses the reference numerals of FIG. 1. In this implementation, the effluent from the hydroisomerisation-conversion zone 7 (step a) undergoes separation in drum 32 of at least a portion of the light gases (hydrogen and hydrocarbon-containing compounds containing at most 4 carbon atoms), for example by flashing. The separated gases are extracted via line 33 and the residual effluent is sent via line 34 into catalytic dewaxing zone 18.

It should be noted that in FIGS. 1, 2 and 3, the effluent from catalytic dewaxing zone 18 is separated. This separation need not be carried out when said effluent is subsequently treated in a hydrofinishing zone, as separation then takes place after that treatment.

This concerns separation carried out in drums or columns 21, 23, 24.

EXAMPLE 1

Preparation of Catalyst A1, in Accordance with the Invention

The support was a silica-alumina used in the form of extrudates. It contained 29.3% by weight of silica $SiO_2$ and 70.7% by weight of alumina $Al_2O_3$. Before adding any noble metal, the specific surface area of the silica-alumina was 330 $m^2/g$ and its total pore volume was 0.87 $cm^3/g$.

The corresponding catalyst A was obtained after impregnating the noble metal onto the support. AS platinum salt $Pt(NH_3)_4Cl_2$ was dissolved in a volume of solution corresponding to the total pore volume to be impregnated. The solid was then calcined for 2 hours in moist air (partial pressure of $H_2O=0.15$ bars) at 550° C. The platinum content was 0.60% by weight. The pore volume, measured on the catalyst, was 0.82 $cm^3/g$, the BET surface area, measured on the catalyst, was 287 $m^2/g$ and the mean mesopore diameter, measured on the catalyst, was 7 nm. The pore volume corresponding to pores with a diameter in the range 4 nm and 10 nm was 0.37 $cm^3/g$, i.e., 44% of the total pore volume. The platinum dispersion measured by $H_2/O_2$ titration was 19%. The results obtained by local analysis of transmission electron microscopic exposures indicated a noble metal particle distribution where the fraction of less than 2 nm exhibited traces of platinum of at most 2% by weight of metal. The histogram of the fraction of particles more than 2 nm in size is represented in FIG. 4. This histogram shows that particles with a size in the range 13±6 nm represented at least 70 number % of the particles.

EXAMPLE 2

Evaluation of Catalyst A1 for Hydroisomerisation of a Fischer-Tropsch feed Followed by Separation and Catalytic Dewaxing The catalyst prepared as described in Example 1 was used to hydroisomerise a paraffin feed from the Fischer-Tropsch synthesis with the principal aim of producing oils. In order to be able to directly use the hydroisomerisation catalyst, the feed was first hydrotreated and the oxygen content brought to below 0.1% by weight. The principal characteristics of the hydrotreated feed were as follows:

| | |
|---|---|
| initial point | 170° C. |
| 10% point | 197° C. |
| 50% point | 350° C. |
| 90% point | 537° C. |
| End point | 674° C. |
| 380$^+$ (weight %) | 42 |
| Pour point | +73° C. |
| Density (20/4) | 0.787 |

The catalytic test unit comprised a single fixed bed reactor used in up-flow mode, into which 80 ml of catalyst was introduced. The catalyst was then placed under a pure hydrogen atmosphere at a pressure of 10 MPa to reduce the platinum oxide to metallic platinum, then finally the feed was injected. The total pressure was 10 MPa; the hydrogen flow rate was 1000 liters of gaseous hydrogen per liter of injected feed; the hourly space velocity was 2 $h^{-1}$; and the reaction temperature was 350° C. After reacting, the effluents were fractionated into light products (gasoline, IP-150° C.), middle distillates (150–380° C.), and residue (380$^{3o\circ}$ C.).

The residue was then dewaxed in a second reactor in upflow mode into which 80 ml of a catalyst containing 80% by weight of a ferrierite zeolite with a Si/Al ratio of 10.2 and 20% of alumina as well as 0.6% by weight of Pt was introduced. The catalyst was placed in a pure hydrogen atmosphere at a pressure of 10 MPa to reduce the platinum oxide to metallic platinum then finally the feed was injected. The total pressure was 10 MPa; the hydrogen flow rate was 1000 liters of gaseous hydrogen per liter of injected feed; the hourly space velocity was 1 $h^{-1}$ and the reaction temperature was 350° C. After reacting, the effluents were fractionated into light products (gasoline IP-150° C., middle distillates (150–380° C.) and residue 380$^{+\circ}$ C.).

The characteristics of the oil obtained were measured.

The table below shows the yields for the different fractions and the characteristics of the oils obtained directly with the feed and with the effluents hydroisomerised using catalyst A1 (in accordance with the invention) then catalytically dewaxed.

| | Hydrotreated feed | Hydroisomerised and catalytically dewaxed effluent |
|---|---|---|
| Catalyst | / | A1 |
| Dewaxing | Solvent, −20° C. | Catalytically dewaxed as per example |
| Density of effluents at 15° C. | 0.790 | 0.779 |
| Wt % 380$^-$/effluents | 58 | 69 |
| Wt % 380$^+$/effluents | 42 | 31 |
| Quality of 380$^+$ residue | | |
| Dewaxing yield (wt %) | 6 | 59 |
| Oil/feed yield | 2.5 | 18.3 |
| Quality of oil | | |
| VI (viscosity index) | 143 | 140 |

| | Hydrotreated feed | Hydroisomerised and catalytically dewaxed effluent |
|---|---|---|
| Cut distribution | | |
| IP-150 | 0 | 12 |
| 150–380 | 58 | 57 |
| 380$^-$ | 42 | 31 |
| Net conversion of 380$^-$ (%) | / | 26.2 |

*The solvent used was methylisobutylketone

It can clearly be seen that the feed which had not been hydroisomerised and solvent dewaxed at −20° C. feed had an extremely low yield of oil while after the hydroisomerisation and catalytic dewaxing operation, the oil yield was higher.

EXAMPLE 3

Evaluation of Catalyst A1 During a Test Carried out to Produce Middle Distillates The same procedure as that described for Example 2 was used, with the same feed, but the operating conditions in the first reactor containing catalyst A1 were modified.

The total pressure was 9 MPa; the hydrogen flow rate was 1000 liters of gaseous hydrogen per liter of injected feed, the hourly space velocity was 1 $h^{-1}$ and the reaction temperature was 355° C. After reacting, the effluents were fractionated into light products (gasoline, IP-150° C.), kerosine (150–250° C.), gas oil (250–380° C.) and residue (380$^+$).

The yields and characteristics are reported below for the different fractions of the hydroisomerised effluents using catalyst A1.

| Cut distribution | (weight %) |
|---|---|
| IP–150° C. | 18 |
| 150–250° C. | 29 |
| 250–380° C. | 43 |
| 380$^-$ | 10 |

Quality of Distillate Products:

| | |
|---|---|
| 150–250° C. | Smoke point: 48 mm |
| | Freezing point: −31° C. |
| 250–380° C. | Cetane index: 62 |
| | Pour point: −20° C. |

Catalyst A1 could produce good middle distillate yields (weight fraction 150–250° C. + weight fraction 250–380° C.=72% by weight) from a paraffin feed from the Fischer-Tropsch process and the middle distillates obtained were of very good quality.

EXAMPLE 4

The hydrocracking residue with the characteristics given in the table below was introduced into a reactor containing a fixed bed of hydroisomerisation-conversion catalyst A2 and hydrogen at a total pressure of 12 mPa and in a $H_2$/HC volume ratio of 1000 N1/N1. The space velocity was thus 1 $h^{-1}$ for the catalyst. The reaction temperature was 340° C.

Catalyst A2 contained a support containing 28% by weight of $SiO_2$ and 72% by weight of $Al_2O_3$ on which 0.5% by weight of Pt had been deposited. The Pt dispersion was 15%.

The effluent was recovered then vacuum distilled to recover a 380° C.+ fraction with the characteristics shown in the table below.

The 250–380° C. fraction which corresponded to a gas oil cut and which resulted from converting hydroisomerisation of a hydrocracking residue had a pour point of −20° C. and a cetane index of 57, which produced an excellent gas oil.

The 380° C.+ fraction prepared above was then introduced into a reactor containing a fixed bed of hydrodewaxing catalyst and hydrogen at a pressure of 14 MPa and in a volume ratio of $H_2$/HC of 2000 N1/N1. The space velocity was 1 $h^{-1}$ on the catalyst. The reaction temperature was 315° C. The hydrodewaxing catalyst contained 0.5% of Pt deposited on a support containing 75% of ferrierite and 25% of alumina.

A hydrofinishing catalyst containing 1% by weight of Pt, 1% by weight of F and 1% by weight of Cl on alumina was charged into a second reactor located downstream of that reactor. The product from the hydrodewaxing reactor was introduced into this reactor which was maintained at a temperature of 220° C. The pressure was 14 MPa and the product circulated at an hourly space velocity of 0.5 $h^{-1}$.

The effluent was recovered then distilled. The characteristics of the 380° C.+ residue are shown in the table below.

This example demonstrates that a combination of a conversion-hydroisomerisation step (step a) and a catalytic dewaxing step leads to high quality products. In particular, it shows that step a) can increase the viscosity index of an oil fraction (380° C.+) from 124 to 136 without sufficiently dropping the pour point (see table, columns 1 and 2. It is this transformation, carried out during step b), which can produce a pour point of −20° C. using the catalytic dewaxing catalyst, and a Saybolt colour of + which endows the product with medicinal quality (see table, columns 2 and 3.

TABLE

|  | 1<br>*Feed =<br>hydrocracking<br>residue | 2<br>Step a), i.e.,<br>hydroisomerisa-<br>tion-conversion | 3<br>Step b), i.e.,<br>catalytic<br>dewaxing +<br>hydrofinishing |
|---|---|---|---|
| Reaction temperature, ° C. | / | 340 | 315 | 220 |
| Total P (bars) |  | 120 | 140 | 140 |
| 380° C. - conversion (weight %) | / | 45 | / |
| Sulphur (ppm by weight) | 9 | / | / |
| Nitrogen (ppm by weight) | 1 | / | / |
| d15/4 of feed or total effluent | 0.8421 | 0.8134 | 0.8117 |
| Amount of 380° C.+ in feed 380° C.+ fraction | 88.5 | / | / |
| Pour point (° C.) | +42 | +38 | −20 |
| ASTM D 1500 colour | 2.7 | / |

TABLE-continued

|  | 1<br>*Feed =<br>hydrocracking<br>residue | 2<br>Step a), i.e.,<br>hydroisomerisa-<br>tion-conversion | 3<br>Step b), i.e.,<br>catalytic<br>dewaxing +<br>hydrofinishing |
|---|---|---|---|
| 380° C.+ fraction after treatment | 380° C.+ fraction of solvent dewaxed hydrocracking residue | 380° C.+ fraction of hydroiso-merised and solvent dewaxed residue | 380° C.+ fraction of hydroiso-merised, dewaxed and catalytically hydrofinished residue |
| VI | 124 | 136 | 134 |
| V100° C. ($mm^2$/s) | 4.95 | 4.82 | 4.93 |
| Pour point (° C.) | −18 | −18 | −20 |
| Saybolt colour | / | / | +30 |
| UV absorption (D2008) |  |  |  |
| 260–280 nm | / | / | /0.0006 |
| 280–290 nm | / | / | 0.0005 |
| 290–300 nm | / | / | 0.0004 |
| 300–360 nm | / | / | 0.0002 |
| 360–400 nm | / | / | <0.0001 |
| 300–330 nm | / | / | 0.0003 |
| 330–350 nm | / | / | <0.0001 |

Solvent = MIBK (methylisobutylketone)
*Residue from a hydrocracking process comprising hydrotreatment followed by zeolitic hydrocracking.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French applications 99/05.496 and 00/02.363, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing oils from a hydrocarbon feed containing at least 20% by volume of compounds boiling above 340° C., said process comprising the following steps in succession:

(a) converting the hydrocarbon feed at least partially to lower boiling molecules with simultaneous hydroisomerisation of at least a portion of n-paraffins of the feed, said feed having a sulphur content of less than 1000 ppm by weight, a nitrogen content of less than 200 ppm by weight, a metals content of less than 50 ppm by weight, and an oxygen content of at most 0.2% by weight, in the presence of a non-zeolitic catalyst containing at least one noble metal deposited on an amorphous acidic support, the dispersion of the noble metal being less than 20%; and (b) catalytic dewaxing of at least a portion of the effluent from step a), in the presence of a catalyst comprising at least one hydrodehydrogenating element and at least one molecular sieve.

2. A process according to claim 1, in which:

step a) is carried out at a temperature of 200–500° C., at a pressure of 2–25 MPa, at a space velocity of 0.1–10 h⁻¹, in the presence of hydrogen in a ratio in the range 100–2000 liters of hydrogen/liter of feed;

step b) is carried out at a temperature of 200–500° C., at a pressure of 1–25 MPa, at an hourly space velocity of 0.05–50 h⁻¹ and in the presence of 50–2000 liters of hydrogen/liter of effluent entering step b).

3. A process according to claim 2, in which the whole of the effluent from step a) is treated in step b).

4. A process according to claim 1, in which the effluent from step a) is distilled to separate the light gases and at least one residue containing compounds with a boiling point of more than at least 340° C., said residue undergoing step b).

5. A process according to claim 1, in which the effluent from step b) is subjected to distillation to separate an oil containing compound with a boiling point of more than at least 340° C.

6. A process according to claim 5, wherein said distillation comprises atmospheric distillation followed by vacuum distillation of the atmospheric residue.

7. A process according to claim 1, in which prior to undergoing step a), the feed is hydrotreated followed by optional separation of water, ammonia and hydrogen sulphide.

8. A process according to claim 1, characterized in that in the catalyst in step a) the fraction of noble metal particles with a size of less than 2 nm represents at most 2% by weight of the noble metal deposited on the catalyst.

9. A process according to claim 1, characterized in that in the catalyst of step a), the size of at least 70% of the noble metal particles is more than 4 nm.

10. A process according to claim 1, characterized in that the support is selected from the group consisting of silica-alumina, a halogenated alumina, an alumina doped with silicon, an alumina-titanium oxide mixture, a sulphated zirconia, and a zirconia doped with tungsten, used alone or as a mixture.

11. A process according to claim 10, characterized in that the support further comprises at least one amorphous matrix selected from the group consisting of alumina, titanium oxide, silica, boron oxide, magnesia, zirconia and clay.

12. A process according to claim 1, characterized in that the support is constituted by an amorphous silica-alumina.

13. A process according to claim 1, characterized in that the support contains 1–95% by weight of silica and the catalyst of step (a) contains 0.05–10% by weight of noble metal.

14. A process according to claim 1, characterized in that the noble metal of the catalyst of step a) and the hydrodehydrogenating metal of the catalyst of step b) is selected from the group consisting of platinum and palladium.

15. A process according to claim 1, in which the catalyst from step b) comprises at least one molecular sieve wherein the microporous system has at least one principal channel type with a pore opening containing 9 or 10 T atoms, T being selected from the group consisting of Si, Al, P, , Ti, Fe, Ga, alternating with an equal number of oxygen atoms, the distance between two accessible pore openings containing 9 or 10 T atoms being equal to at most 0.75 nm, and said sieve having a 2-methylnonane/5-methylnonane ratio of more than 5 in the n-decane test.

16. A process according to claim 15, in which the sieve is a zeolite selected from the group consisting of NU-10, EU-1, EU-13, ferrierite, ZSM-22, theta-1, ZSM-50, ZSM-23, NU-23, ZSM-35, ZSM-38, ZSM-48, ISI-1, KZ-2, ISI-4 and KZ-1.

17. A process according to claim 4, in which the effluent from step b) undergoes a hydrofinishing step before being distilled.

18. A process according to claim 1, in which the hydrocarbon feed contains at least 20% by volume of compounds boiling at or above 380° C.

19. A process according to claim 1, in which the hydrocarbon feed is selected from the group consisting of effluents from the Fischer-Tropsch unit, vacuum distillates from straight run distillation of crude oil, vacuum distillates from conversion units, vacuum distillates from aromatic compound extraction units, vacuum distillates originating from desulphurisation or hydroconversion of atmospheric residues and/or a vacuum residues, deasphalted oils, hydrocracking residues and any mixture of said feeds.

20. A process according to claim 1, wherein the dispersion of the noble metal of the catalyst in step (a) is about 15%.

21. A process according to claim 20, wherein the noble metal catalyst of step (a) is platinum.

22. A process according to claim 1, wherein the dispersion of the noble metal of the catalyst in step (a) is about above 1% to 19%.

23. A process according to claim 1, wherein the dispersion of the noble metal of the catalyst in step (a) is about above 1% to 15%.

24. A process according to claim 22, wherein the noble metal is platinum.

25. A process according to claim 23, wherein the noble metal is platinum.

* * * * *